US006488383B1

(12) United States Patent
Hanft et al.

(10) Patent No.: US 6,488,383 B1
(45) Date of Patent: Dec. 3, 2002

(54) VEHICULAR EXTERIOR REARVIEW MIRROR ASSEMBLY WITH ACTUATOR

(75) Inventors: Karl H. Hanft, Holland, MI (US); Edward A. Gahan, Fennville, MI (US); David N. Sizemore, Cedar Springs, MI (US)

(73) Assignee: Hadley Products, Grandville, MI (US)

( * ) Notice: Subject to any disclaimer, the term of this patent is extended or adjusted under 35 U.S.C. 154(b) by 0 days.

(21) Appl. No.: 10/015,336

(22) Filed: Nov. 30, 2001

Related U.S. Application Data

(63) Continuation of application No. 09/661,177, filed on Sep. 13, 2000, now Pat. No. 6,325,520
(60) Provisional application No. 60/154,137, filed on Sep. 15, 1999.

(51) Int. Cl.⁷ .................................................. G02B 7/82
(52) U.S. Cl. ....................... 359/871; 359/872; 359/855; 359/864; 359/865
(58) Field of Search ................................ 359/871, 872, 359/855, 864, 865, 874, 875, 877; 248/476, 481

(56) References Cited

U.S. PATENT DOCUMENTS

| | | | |
|---|---|---|---|
| 3,788,734 A | 1/1974 | McDuffee, Sr. | 350/289 |
| 4,116,538 A | 9/1978 | Oskam | 350/289 |
| 4,281,899 A | 8/1981 | Oskam | 350/289 |
| 4,498,738 A | 2/1985 | Kunai | 350/637 |
| 4,502,759 A | 3/1985 | Herzog et al. | 350/636 |
| 4,504,116 A | 3/1985 | Sharp | 350/637 |
| 4,555,166 A | 11/1985 | Enomoto | 350/634 |
| 4,648,693 A | 3/1987 | Losch | 350/636 |
| 4,693,571 A | 9/1987 | Kimura et al. | 350/634 |
| 4,701,037 A | 10/1987 | Bramer | 350/634 |
| 4,877,214 A | 10/1989 | Toshiaki | 24/483 |
| 4,988,178 A | 1/1991 | Eifert | 350/631 |
| 5,042,932 A | 8/1991 | Pent | 359/874 |
| 5,082,361 A | 1/1992 | McKee | 359/876 |
| 5,115,352 A | 5/1992 | do Espirito Santo | 359/855 |
| 5,238,214 A | 8/1993 | Syamoto et al. | 248/544 |
| 5,294,084 A | 3/1994 | Syamoto et al. | 248/544 |
| 5,721,646 A | 2/1998 | Catlin et al. | 359/865 |

FOREIGN PATENT DOCUMENTS

| | | | |
|---|---|---|---|
| EP | 0 310 261 A1 | 9/1988 | |
| EP | 0 590 510 A1 | 9/1993 | B60R/1/06 |
| WO | WO 95 30495 | 11/1995 | B05D/5/06 |

OTHER PUBLICATIONS

Prior Art Truck Mirror Actuator drawing for Part 530 dated Mar. 27, 1992.

*Primary Examiner*—Mohammad Sikder
(74) *Attorney, Agent, or Firm*—Van Dyke, Gardner, Linn & Burkhart, LLP

(57) ABSTRACT

A vehicular exterior rearview mirror assembly for large vehicles, such as trucks, includes a reflective element, a support bracket, and an actuator mounting the reflective element to the support bracket. A mirror housing is secured to the support bracket. The electrical actuator is mounted to the support bracket by a plurality of fasteners and includes an actuator housing, which has a peripheral surface extending around the fasteners. The support bracket provides bearing contact for at least a portion of the peripheral surface of the housing to reduce the vibration and improve the stability of the mirror assembly. The electrical actuator includes a movable member which supports the reflective element for movement therewith and which extends into the actuator housing and frictionally engages the housing to minimize vibration of the movable member when it pivots. The electrical actuator preferably includes a biasing member to enhance the friction between the movable member and the housing to further reduce the vibration of the movable member and, therefore, the reflective element supported thereon.

22 Claims, 8 Drawing Sheets

VEHICULAR EXTERIOR REARVIEW MIRROR ASSEMBLY WITH ACTUATOR

This application is a continuation application of U.S. Pat. application Ser. No. 09/661,177, filed Sep. 13, 2000, by Karl H. Hanft, Edward A. Gahan, and David N. Sizemore, entitled VEHICULAR EXTERIOR REARVIEW MIRROR ASSEMBLY WITH ACTUATOR, now U.S. Pat. No. 6,325,520, which claims priority from provisional application entitled VEHICULAR EXTERIOR REARVIEW MIRROR ASSEMBLY WITH ACTUATOR, Ser. No. 60/154,137, filed Sep. 15, 1999, which are herein incorporated reference in their entireties.

TECHNICAL FIELD AND BACKGROUND OF THE INVENTION

The present invention relates to rearview mirror assemblies for large vehicles and, more particularly, to exterior rearview mirror assemblies with actuators which provide for adjustment of the reflective element for use on large vehicles, such as trucks, semi-trucks, vans, and the like.

Conventional exterior rearview mirror assemblies for trucks, vans and other large vehicles include a support bracket, a mirror housing which is mounted to the support bracket, a reflective element which is supported by the support bracket, and mirror mounting posts which extend from the support bracket for mounting the mirror assembly to support arms or mounting brackets on the vehicle. In other mirror assemblies, the actuator may be mounted directly to the housing. More recently these large vehicle exterior rearview mirror assemblies also include electrically operated actuators which support the reflective element on the support bracket or housing and provide remote adjustment of the reflective element.

In such larger vehicles, the suspension systems are usually much stiffer and less resilient than on most passenger vehicles. Furthermore, many trucks and vans have diesel engines which exhibit high vibration levels. As a result these larger vehicles induce relatively high base-level vibrations in the exterior mirror assemblies which they carry. Often this vibration is amplified by the vibration characteristics of the mirror assembly itself and, further, by the less-than-rigid mounting arrangements for the mirror assemblies often associated with larger vehicles.

One component that has an impact on the vibration of mirror assemblies, in general is the actuator. Trucks and vans often have large reflective elements on the order of at least 50 square inches. With increases in the size of the reflective element, the size and weight of the actuator also increases. The increase in actuator weight is most significant in electric actuators. Electric actuators add significant weight to a mirror assembly, especially in these large mirror assemblies. Heretofore, these larger electric actuators also require special mounting arrangements. For example, actuators available from Eaton of Three Rivers, Mich. include three mounting holes which are centrally located on the base wall of the actuator housing rather than at the periphery of the housing. As a result, these mounting arrangements are relatively flexible. Furthermore, the manufacturers of the Eaton actuators require the actuators to be mounted on posts or bosses which project from the support bracket and require a minimum spacing between the base wall of the actuator housing and the support bracket. This requirement is designed to avoid deformations to the base wall when the fasteners, which secure the actuator, are tightened. Deformations in the actuator housing wall can lead to binding of the actuator. The larger actuators, therefore, exhibit significant vibration, and when coupled with the inherent vibration of trucks, semis, vans and other large vehicles, often result in unacceptable vibration levels in the reflective element.

Therefore, there is a need for an exterior rearview mirror assembly, especially for large vehicles, which provides for remote adjustment of the reflective mirror element while minimizing the inherent vibration characteristics of the mirror assembly so that acceptable vibration levels in the reflective element are maintained.

SUMMARY OF THE INVENTION

Accordingly, the present invention provides an improved, vehicular exterior rearview mirror assembly for vehicles, especially suitable for larger vehicles, such as heavy trucks, vans and the like. The vehicular exterior rearview mirror assembly of the present invention provides an actuator mount with improved stiffness and rigidity resulting in significantly reduced vibration and consequent image blurring in the reflective element. Further, the assembly has an increased natural frequency which prevents resonance in normal operating ranges of these vehicles to help stabilize the mirror. The reduced vibration also reduces stress on any mirror arms or supports which attach the mirror assembly to the vehicle.

In one form, the invention is a vehicular exterior rearview mirror assembly for large vehicles, such as trucks, which includes a reflective element, a support bracket, and an actuator mounting the reflective element to the support bracket. A mirror housing is secured to the support bracket. The electrical actuator includes a housing with a central portion and a peripheral portion extending around the central portion, with the central portion being mounted to the support bracket. The assembly provides bearing contact for at least a portion of the peripheral surface of the housing and the support bracket to reduce the vibration and improve the stability of the mirror assembly.

In one aspect, the bracket includes a mounting surface and a resilient member interposed between the mounting surface and the peripheral surface of the actuator to provide the bearing contact. For example, the resilient member may comprise at least one resilient pad, which is secured to the support bracket. Preferably, the resilient pad is secured to the mounting surface of the support bracket, for example by an adhesive. The resilient pad preferably comprises a cellular urethane or equivalent type material. In other aspects, the resilient member has a durometer in a range of 12 to 18 Shore O.

In further aspects, the support bracket provides bearing contact for at least 50% of the peripheral surface of the actuator, more preferably contact for at least 75% of the peripheral surface of the actuator housing, and most preferably contact for approximately 100% of the peripheral surface. In other aspects, the support bracket includes an enlarged medial portion which is at least as large as the peripheral surface of the housing to provide the bearing contact.

In yet other aspects, the electrical actuator housing includes a movable member which extends into the housing and forms a friction contact with the housing. The movable member provides adjustment for the reflective element, with the frictional contact dampening the vibration of the movable member and reflective element. The actuator also includes a biasing member to urge the housing into frictional engagement with the movable member to thereby enhance the friction between the movable member and the housing to further reduce vibration of the movable member and of the reflective element. For example, the biasing member may comprise a resilient ring, which extends around the actuator housing to urge the actuator housing into frictional engagement with the movable member. Preferably, the resilient ring comprises a rubber elastic ring.

In another form of the invention, an exterior rearview mirror assembly for large vehicles, including trucks and vans, includes a one piece casing, a support bracket which extends between and is secured to the opposing end walls of the casing, a reflective element, and an electric actuator which supports the reflective element in the housing. The electric actuator is supported to the support bracket and includes an actuator housing having mounting openings for receiving fasteners, which mount the actuator to the bracket, and a peripheral surface which extends around the mounting openings. The support bracket provides bearing contact with at least a portion of the peripheral surface to provide a rigid mounting with an electric actuator in the mirror assembly.

In one aspect, the support bracket includes a medial portion which is at least the size of the peripheral surface of the actuator housing. For example, the support bracket may include an adapter plate mounted thereto which provides the bearing surface for the actuator. The adapter plate may be formed from metal, such as cast aluminum or plastic. In other aspects, the bracket further includes a gasket for providing bearing contact with the peripheral portion.

According to yet another form of the invention, an exterior rearview mirror assembly for large vehicles, such as trucks and vans, includes a reflective mirror element having a reflective surface of at least 50 square inches, a support bracket which is adapted for mounting to a vehicle, and a mirror casing which is secured to the support bracket. The mirror assembly further includes an actuator which is mounted to the support bracket by a plurality of fasteners, with the reflective mirror element being supported by the actuator in the casing. The actuator includes an actuator housing with a peripheral surface extending around the fasteners, which mount the actuator to the bracket, with the support bracket providing bearing contact for at least a portion of the peripheral portion surface of the housing whereby the mirror assembly has reduced vibration and improved stability. The actuator may, for example, comprise an electric or manual hand set actuator.

In other aspects, the support bracket comprises an elongated truss-like support bracket and further includes an enlarged medial portion, with the enlarged medial portion providing the bearing contact. Preferably, the enlarged medial portion is sized at least as large as the peripheral surface of the housing.

Accordingly, the present invention provides a vehicular exterior rearview mirror assembly for vehicles including trucks, semis, vans and the like, which has reduced vibration and increased stability to provide clearer viewing images for the vehicle driver. The assembly includes an improved support bracket which provides a rigid support for the actuator thereby improving the rigidity of the actuator mounting and the natural frequency of the mirror assembly.

These and other objects, advantages, purposes and features of the invention will become more apparent from a study of the following description taken in conjunction with the drawings.

DESCRIPTION OF THE PREFERRED EMBODIMENTS

Figure 1:
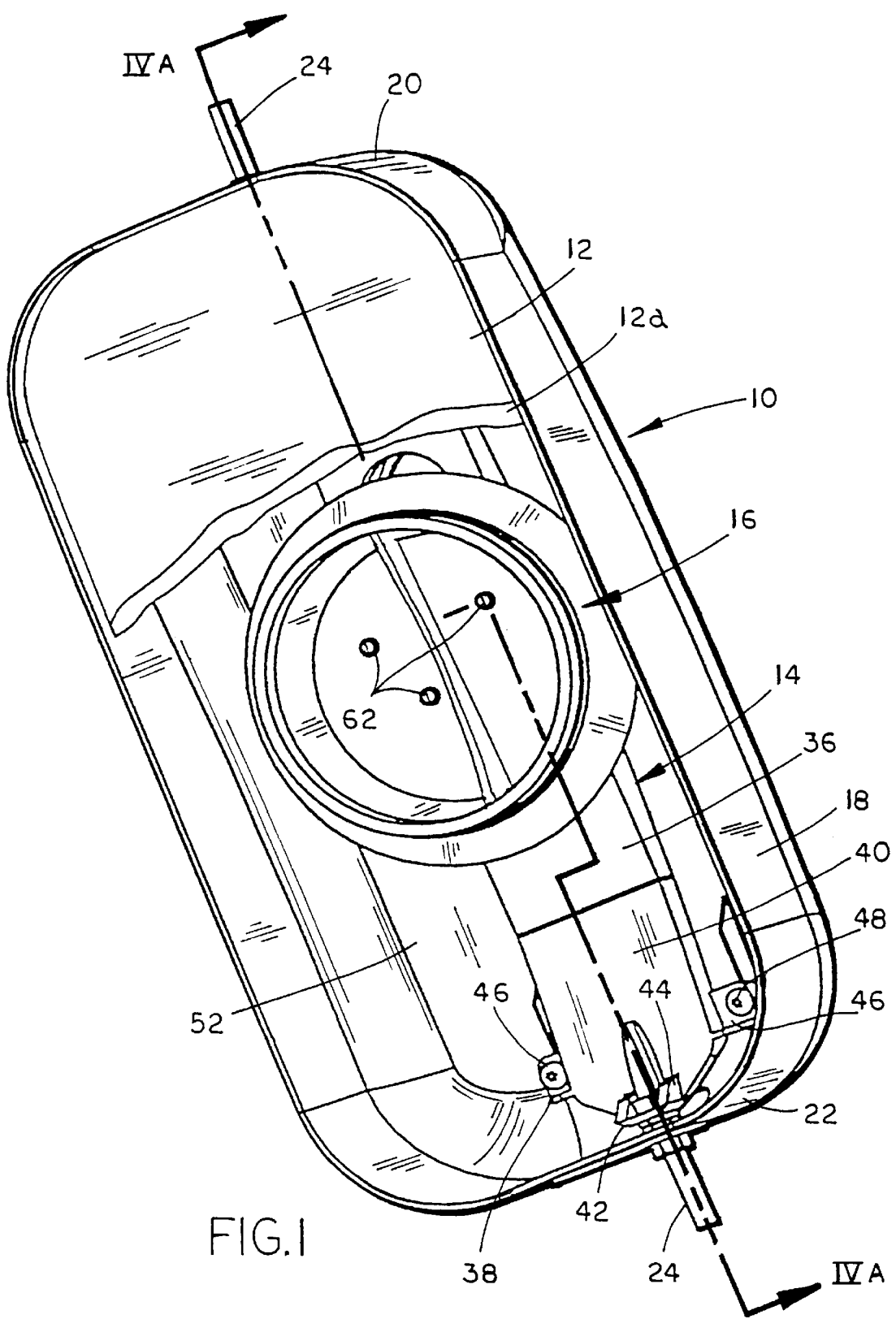
FIG. 1 is a front, perspective view of a first embodiment of the vehicular exterior rearview mirror assembly of the present invention having portions of the mirror element broken away to reveal the actuator and internal support structure.

Referring FIG. 1, the numeral 10 generally designates a vehicular exterior rearview mirror assembly of the present invention, which is especially adapted for use on large vehicles, such as heavy trucks, semis, vans and the like. Mirror assembly 10 includes a reflective mirror element 12, a support bracket 14, an actuator 16, and a casing or shell 18 supported by bracket 14. Casing 18 is preferably a one-piece, aerodynamically designed metal or plastic casing, which will be more fully described below.

Figure 2:
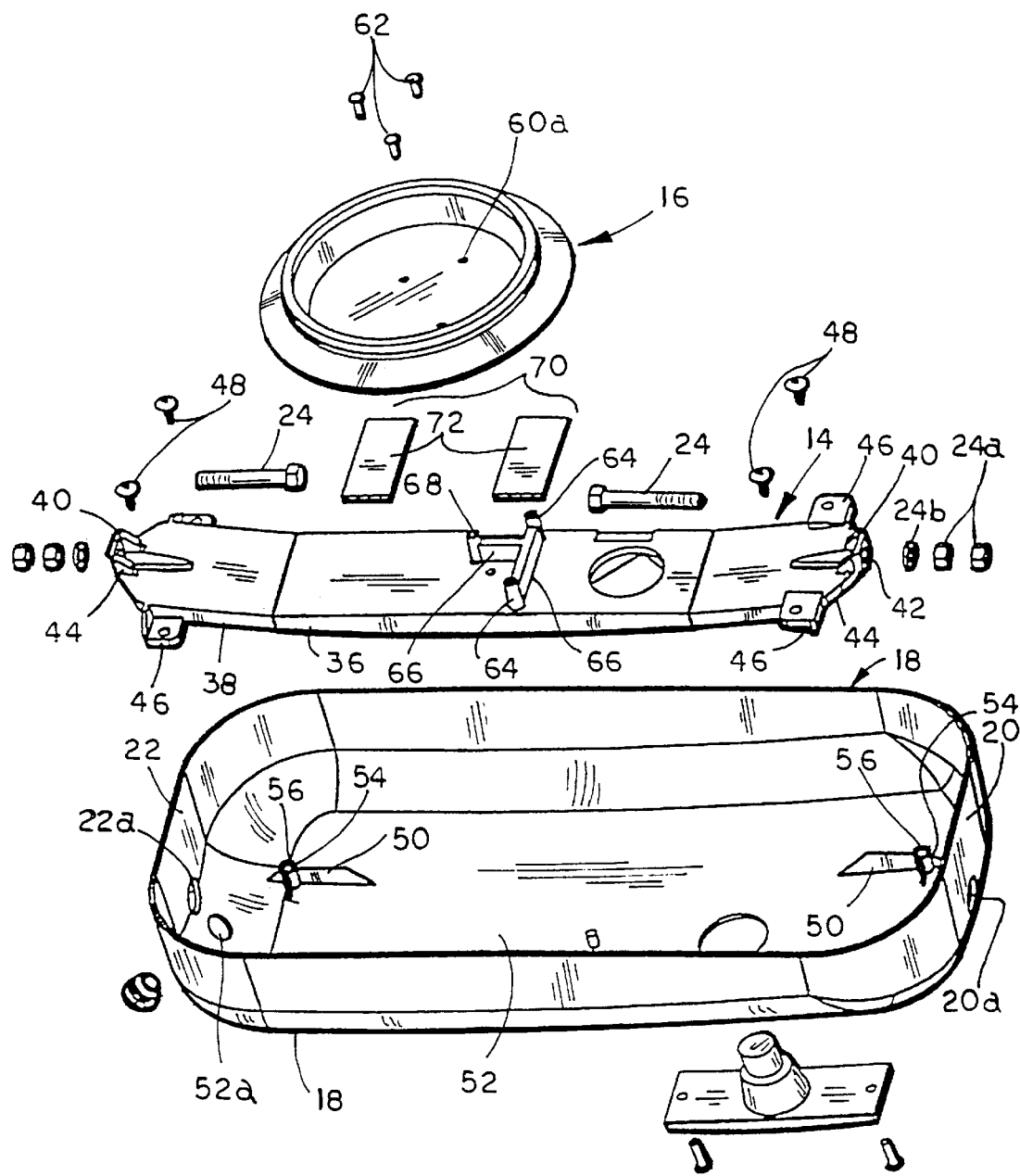
FIG. 2 is an exploded perspective view of the mirror assembly of FIG. 1 with portions of the mirror assembly omitted for clarity.
Figure 3:
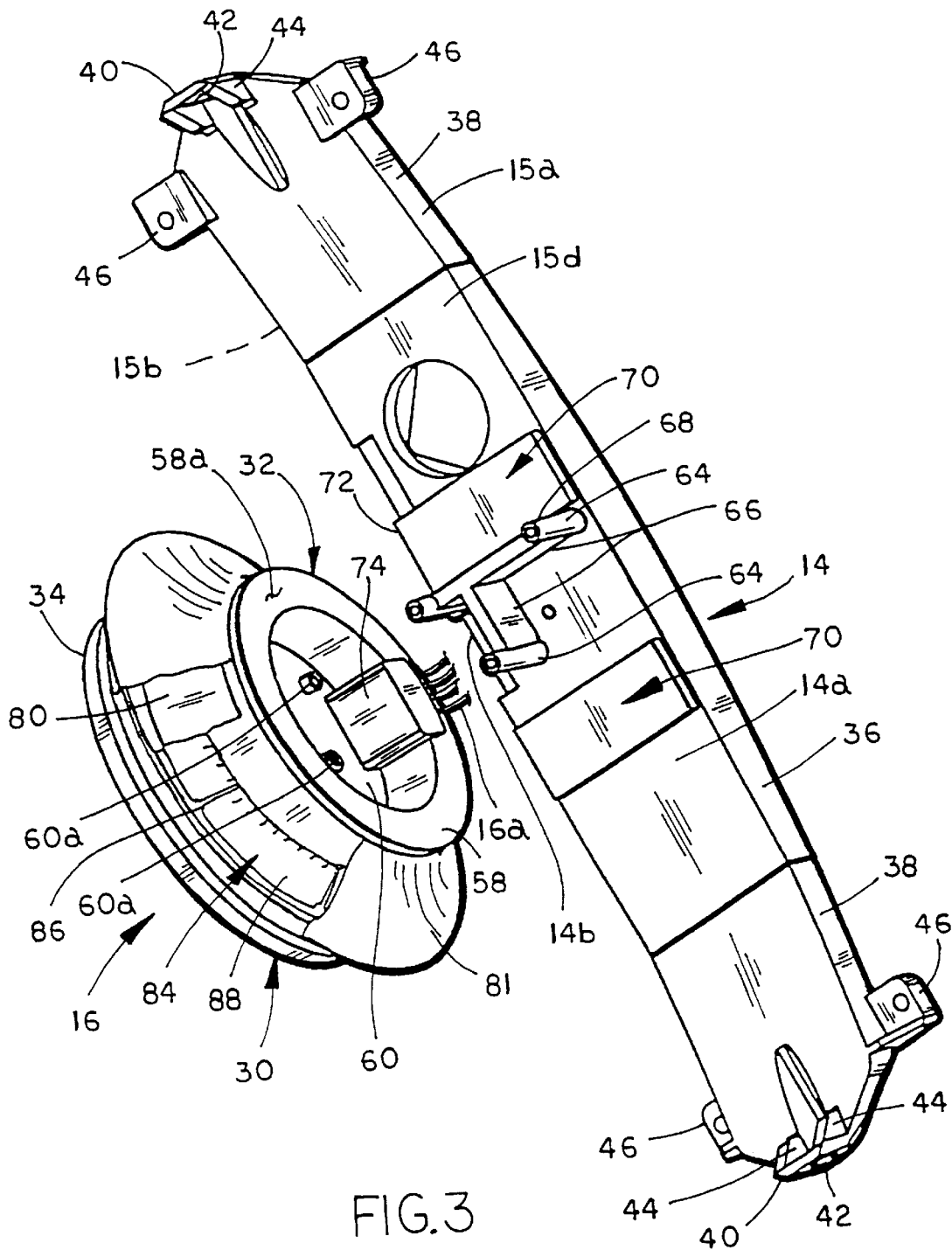
FIG. 3 in enlarged exploded perspective view of the support bracket and actuator shown in FIG. 1.
Figure 4A:
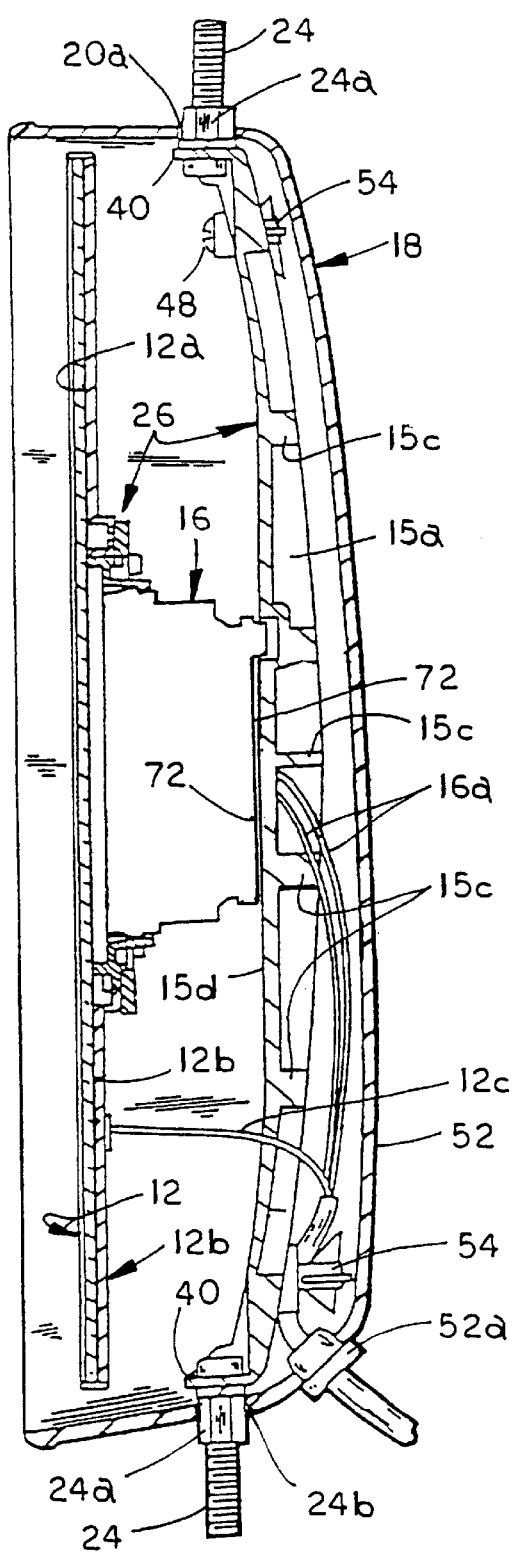
FIG. 4A is a cross-section view of the mirror assembly of FIGS. 1–3 taken along line IVA—IVA of FIG. 1.
Figure 4B:
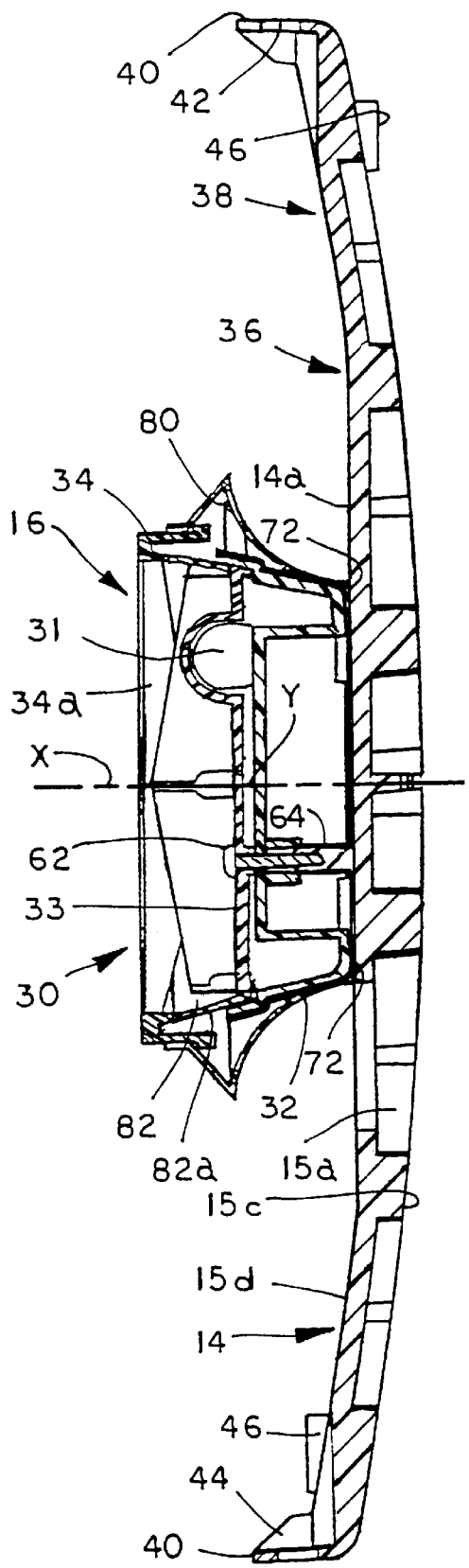
FIG. 4B is an enlarged cross-section view similar to FIG. 4A illustrating the actuator and support bracket of FIGS. 1–4A.

As best understood from FIGS. 1 and 2, support bracket 14 spans the interior space of the mirror casing 18 and extends from an upper wall 20 to a lower wall 22 of casing 18 and includes a pair of mounting studs 24 at its opposed ends which extend through casing 18 and are secured thereto by nuts 24a and washers 24b positioned at end walls 20, 22 for mounting assembly 10 to a vehicle mounting bracket or mounting arms (not shown). Support bracket 14 is preferably an elongated, truss-type bracket, and more preferably sand or die cast from a lightweight metal or metal alloy, such as 319, 356 or 380 aluminum alloy or magnesium, and may be, for example, electrostatically powder painted to provide increased stiffness and rigidity with reduced weight. As best seen in FIGS. 3, 4A, and 4B, bracket 14 includes a pair of side members 15a and 15b which are interconnected by a plurality of reinforcing webs 15c (FIG. 4). Extending over side members and webs 15a, 15b, and 15c is a thin cover 15d. For further details of one preferred embodiment of bracket 14, reference is made to U.S. Pat. No. 5,721,646 to Michael Catlin, the disclosure of which is incorporated by reference herein in its entirety.

Mirror element 12 is preferably a rectangular sheet or panel of glass having rounded corners, preferably having a thickness of 0.063–0.125 inches. The size of reflective element 12 may vary but in large vehicle applications, such as trucks or semis, preferably has an area of at least 50 square inches and, most preferably, is 15"×7". However, it should be understood that other dimensioned reflective elements may be used and, further, that more than one reflective element, such as disclosed in U.S. Pat. No. 5,721,646, may be used. A reflective coating of a conventional chrome alloy or other metals or materials is applied by conventional coating methods to the front and/or first surface of mirror element 12, preferably providing reflection of at least about 55 percent of the light incident thereon. Reflective element 12 is preferably releasably mounted to actuator 16, for example, by a support plate 12a and mounting assembly 26 (FIG. 4A), which described in detail in U.S. Pat. No. 5,721,646. However, it should be understood that other conventional mounting arrangements may be used. In addition, reflective element 12 may include a resistive heating element or pad 12b preferably adhered to the rear surface of mirror element 12 or support 12a which when activated melts ice or snow that may have collected on the surface of the mirror element. Reference is made to U.S. Pat. No. 5,721,646 for further details of one suitable heating pad.

In the illustrated embodiment, actuator 16 comprises an electric motor actuator and provides adjustment of the position of mirror element 12 to various viewing positions about horizontal and vertical axes in response to electrical signals generated by a remote control located in the vehicle cab or passenger compartment. Actuator 16 includes electrical wires or cables 16a which project from actuator 16 and are harnessed with other wiring, for example, wiring 12c for heater pad 12b, and other electrical or electronic devices in casing 18 and are directed out of casing 18 through an opening 52a provided in rear wall 52 of casing 18 for coupling to the electrical system of the vehicle. Actuator 16 is preferably an electrically operated adjustable actuator of the type sold under Model No. 530 by Eaton Corp. of Three Rivers, Mich. Electrical actuator 16 may also be of the type disclosed in U.S. Pat. Nos. 4,101,206 and/or 4,116,538, the disclosures of which are hereby incorporated by reference herein. Alternately, actuator 16 may be of the type disclosed in U.S. Pat. No. 4,281,899, the disclosure of which is also incorporated by referenced herein. It should be understood that actuator 16 may comprise a manual or remote manual actuator as well.

Referring to FIGS. 1 and 4A, actuator 16 supports reflective element 12 on bracket 14 and is mounted to support bracket 14 in a manner to reduce vibration and to increase stability of the overall assembly, as will be more fully explained below. As best seen in FIG. 3, support bracket 14 includes elongated body 36, which extends the entire length of the bracket and which includes curved or angled portions 38 for mounting bracket 14 to casing 18. Curved end portions 38 include end mounting flanges 40 each with an aperture 42 extending therethrough for receiving mounting studs 24. Each mounting flange 40 is reinforced by triangular shaped gusset plates 44. Thus, studs 24 extend through openings 42 and further through openings 20a and 22a provided in end walls 20, 22 of casing 18 and are secured therein by nuts 24a and washers 24b for mounting assembly 10 on a vehicle mounting bracket or support arms. Extending outwardly and laterally from curved end portions 38 are pairs of mounting tabs or flanges 46 to which casing 18 is mounted using fasteners 48 (FIG. 2). Tabs 46 are supported on rearward wall 52 by mounting bosses 54, which are reinforced by triangular shaped gussets 50 formed on rearward facing wall 52 of casing 18. Each boss 54 includes a tapered aperture 56 formed therein for receiving fasteners 48. In this manner, casing 18 is rigidly mounting to bracket 14, which in turn is rigidly mounted to the respective vehicle mounting bracket or support arms (not shown).

As shown in FIGS. 4A and 4B, support bracket 14 preferably provides bearing contact for actuator 16. As best seen in FIG. 4B, actuator 16 includes a housing 30, a pair of electric motors 31 (only one shown) supported in housing 30, and rack and pinion gearing (not shown). Housing 30 includes a base 32 for mounting to support bracket 14, a cover 33 for enclosing motors 31 and the rack and pinion gearing, and a movable member 34 to which reflective element 12 and support plate 12a are mounted. Movable member 34 is pivotally mounted to housing 30 on a transverse arm 34a and is driven to pivot about both x and y axes by rack and pinion gearing (not shown). Referring again to FIG. 3, base member 32 includes an annular peripheral or perimeter portion 58 which includes a peripheral planar surface 58a. Peripheral planar surface 58a extends around and is spaced outwardly toward bracket 14 from base wall 60 of base member 32. Base wall 60 includes a plurality of openings 60a (FIG. 2) through which fasteners 62 extend for securing actuator 16 to support bracket 14. As best seen in FIGS. 2 and 3, at the medial portion of bracket 14 is a series of three upstanding securing posts of bosses 64 which are interconnected and reinforced by walls 66. Each post 64 includes a threaded opening 68 for receiving a respective threaded fastener 62 for securing actuator 16 to bracket 14. Posts or bosses 68 are sized to extend to base wall 60 such that peripheral portion 58 is preferably spaced approximately 0.7 mm±1.7 mm from upper surface 14a of bracket 14. Positioned between perimeter surface 58 and upper surface 14a of bracket 14 is a gasket 70. In the illustrated embodiment, gasket 70 comprises a pair of resilient members or pads 72 which extend transversely across upper surface 14a of bracket 14. Preferably, resilient pads 72 have a durometer in a range of 12 to 18 Shore O. In addition, pads 72 preferably compress at least 10% but no more than 30% when actuator 16 is secured to bracket 14. In most preferred form, pads 72 are compress approximately 20% and have a durometer of approximately 18 Shore O. In preferred form, pads 72 comprise a PORON™ cellular urethane, which is commercially available under Part No. 4701-50-15125-1604 from Grand Haven Gasket of Michigan which has a density of approximately 20 lbs. per cubic foot, a maximum compression of 20% at 70 C and a durometer hardness of approximately 18 Shore O. Pads 72 are, further, preferably mounted to upper surface 14a of bracket 14 by an adhesive. It should be understood that pads 12 may be Hi adhered to the peripheral surface 58 of actuator 16 instead. Preferably, pads 72 make bearing contact with at least 50% of the peripheral portion 58 of actuator housing 30, more preferably, at least 75% of the peripheral portion, and in most preferred form approximately 100% of the peripheral portion. It should be understood that in order to increase the contact area, the width of the bracket may be increased either locally, as described in reference to the second embodiment, or over the entire length of the bracket. In this manner, when fasteners 62 extend through mounting openings 60a and are secured in bosses 68, peripheral portion 58 will make bearing contact with and compress pads 72 of bracket 14. As previously noted, pads 72 preferably compress at least 10% but no more than 30% when fasteners are tightened. Pads 72 dampen the vibration of actuator 16 which results in a substantially rigid mounting of actuator 16 on bracket 14. Furthermore, as best seen in FIG. 4, upper surface 14a of bracket 14 includes a recessed portion 14b to accommodate electrical housing member 74 which projects outwardly from base wall 60 and peripheral portion 58 of actuator housing 30 and through which wires 16a extend for coupling to the electrical system of the vehicle. By rigidly mounting actuator 16 to bracket 14, at least over the resonant frequency range of the vehicle, the exterior rearview mirror assembly's vibration characteristic is drastically improved and the additional harmonics often produced by the actuator mounting are effectively eliminated.

In order to further reduce the vibration characteristics of the actuator 16 itself, actuator 16 includes a biasing member 80, which urges base 32 into further frictional engagement with movable member 34. As best seen in FIGS. 3 and 4, movable member 34 includes an arcuate downwardly depending wall 82 which extends between cover 33 and base 32. Base 32 includes an upwardly extending annular rim 84 which includes a plurality of elongated slots 86 which extend into an upper offset portion 88 of rim 84. Biasing member 80 preferably extends around at least upper offset portion 88 of rim 84 to bias rim 84 into frictional engagement with the outer surface 82a of arcuate wall 82 of movable member 34. In this manner, the friction between base member 32 and movable member 34 is increased or enhanced to reduce the vibration of movable member 34 and, therefore, reflective element 12. In addition, peripheral surface 58a is spaced inwardly of rim 84 so that the bearing forces on surface 58a from the mounting arrangement do not induce distortions in rim 84 and, therefore, do not interfere with the movement of movable member 34. Biasing member 80 preferably comprises a resilient annular member, for example, a wide rubber elastic band or ring. Biasing member 80 is preferably a EPDM material, with a preinstalled diameter of 84.7 mm, and a 70 durometer EPDM material. Furthermore, shown in FIGS. 3 and 4B is a protective rubber boot or cover 81 which extends between base 32 and movable member 34 to protect actuator 16 from debris and moisture.

Figure 5:
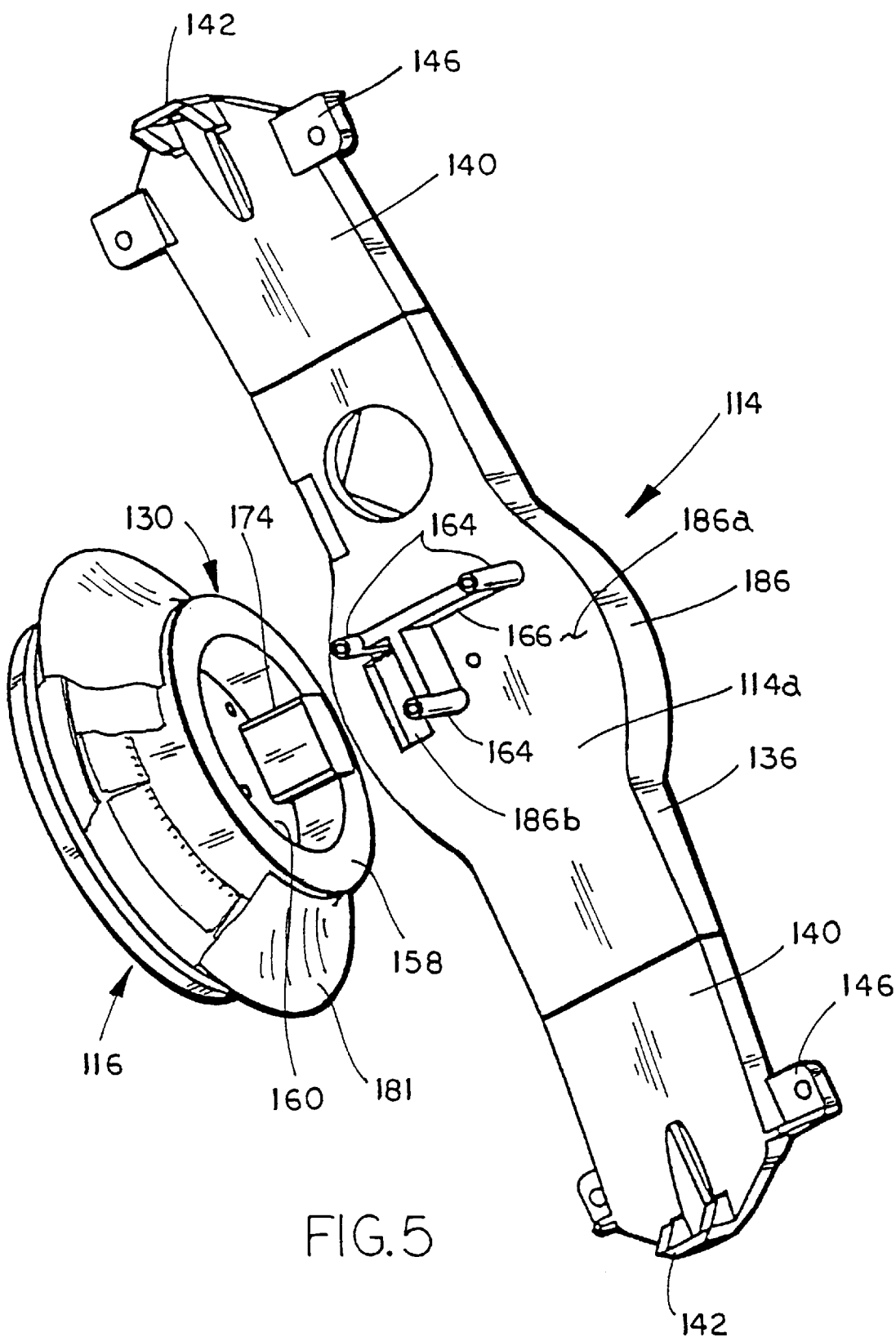
FIG. 5 is an enlarged exploded perspective view of a second embodiment of the support bracket and actuator mounting.

As shown in FIG. 5, a second embodiment 114 of exterior rearview mirror assembly support bracket is illustrated. Like numerals are used to indicate like parts to those included in mirror assembly 10. Bracket 114 is similar to bracket 14 but includes a modified elongated body 136. Elongated body 136 includes curved end portions 140 similar to bracket 14 and an enlarged central portion 186, which provides bearing support for actuator 116, as will be more fully described below.

Similar to the previous embodiment, curved end portions 140 include mounting flanges 142 through which the mounting studs extend and further includes mounting tabs 146 for securing the casing to bracket 114. Projecting outwardly from a medial portion of elongated body 136 are a plurality of mounting bosses 164 which are reinforced by walls 166, in a similar manner to the previous embodiment. In this embodiment, however, mounting bosses 164 are sized such that when actuator mounting fasteners 162 are extended through actuator housing 130, peripheral portion 158 of actuator housing 130 contacts and bears on upper surface 114a of bracket 114 at enlarged portion 186. Furthermore, enlarged portion 186 is preferably sized such that peripheral or perimeter portion 158 of actuator housing 130 makes full contact with upper surface 114a of bracket 114. In addition, enlarged portion 186 preferably includes a planar surface 186a to assure a good interference fit between actuator 116 and bracket 114. An interference fit is more suitable where bracket 114 is made from precise casting. For example, permanent mold casting, such as steel mold casting, permits a more precise casting. In order to achieve the interference fit between actuator 116 and bracket 114, the post or boss height must be controlled with greater precision to avoid deformation or warpage of the actuator housing. For example, for IKU model 530, bosses 164 should have a height of approximately 18.7 mm, with a tolerance of ±0.3 mm. To accommodate electrical housing portion 174 of actuator 116, upper surface 186a of enlarged portion 186 includes a recessed portion 186b similar to recessed portion 14b. In this manner, actuator 116 is rigidly mounted to support bracket 114 and thus exhibits reduced harmonics and, further, does not induce any added vibration to the reflective element of the rearview mirror assembly. It should be understood as noted in reference to the first embodiment, the full length of bracket 114 may be enlarged, or at least the portion between curved end portions 140. As described in reference to the previous embodiment, bracket 114 preferably provides bearing contact with at least 50% of peripheral surface 158, more preferably 70% of peripheral surface 158, and most preferably approximately 100% of peripheral surface 158.

Figure 6:
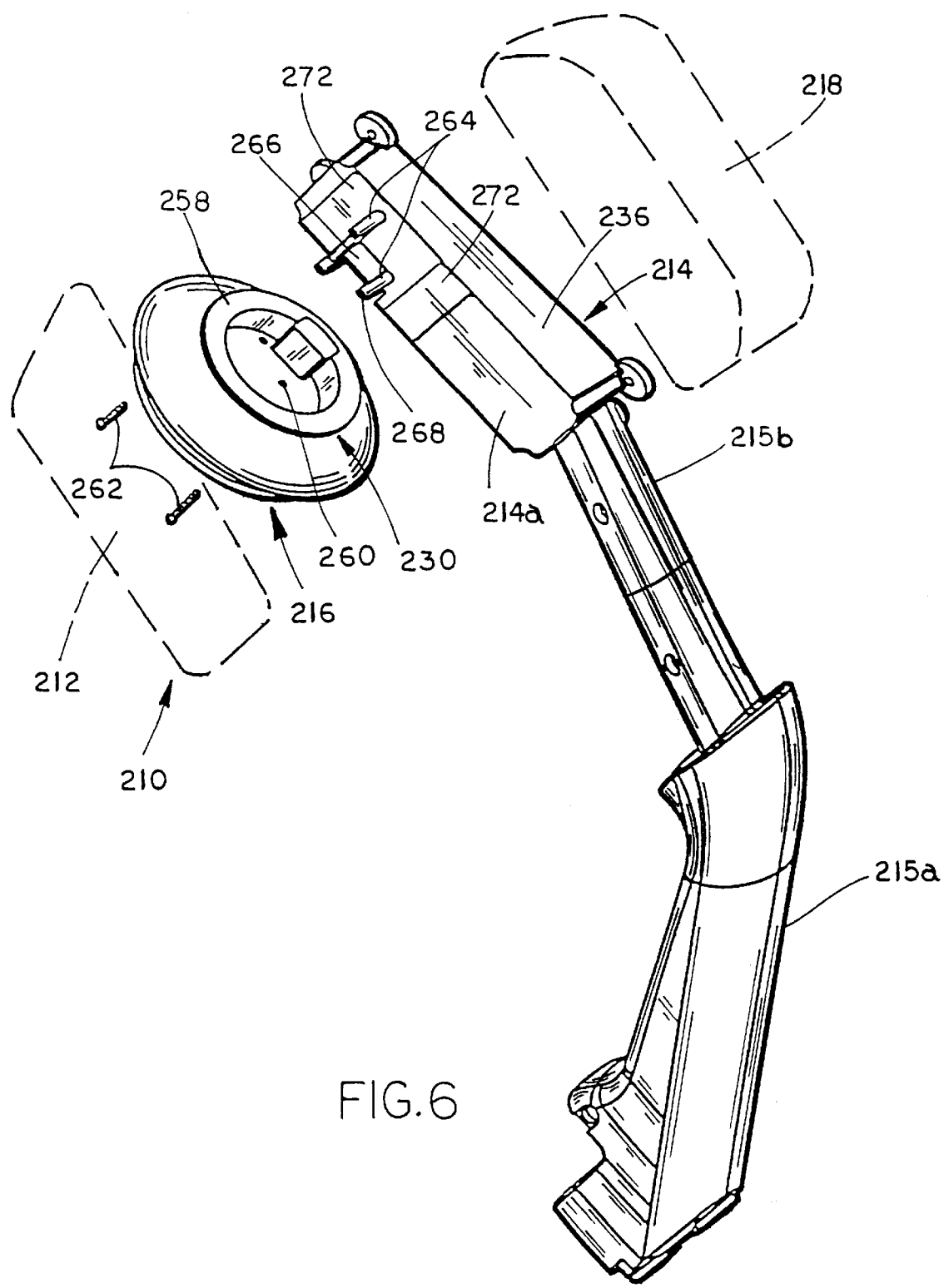
FIG. 6 is an exploded perspective view of a third embodiment of the vehicular exterior rearview mirror assembly of the present invention.

Referring to FIG. 6, a third embodiment of mirror assembly 210 is illustrated. Mirror assembly 210 includes a casing 218 (shown in phantom), a reflective element 212 (shown in phantom), a support bracket 214, and an actuator 216. Actuator 216 is of similar construction to actuator 16. Mirror assembly 210 further includes a fixed mounting bracket 215a for directly mounting assembly 210 to the vehicle door or frame and also an extension arm 215b to which support bracket 214 is mounted or formed therewith.

Similar to the first embodiment, support bracket 214 includes an elongated body 236, which extends between opposed end walls of the mirror casing 218. In the illustrated embodiment, bracket 214 has a tubular shaped body and, further, similar to the previous embodiments is preferably a truss-like bracket or non-solid bracket to reduce the weight of the bracket. Projecting outwardly from mounting surface 214a of elongated portion 236 are a plurality of mounting bosses or posts 264 which are interconnected by reinforcing walls 266, in a similar manner to the previous embodiments. Actuator 116 is mounted to mounting bosses 264 by fasteners 262 which extend through openings 260 in actuator housing 30 and extend into corresponding threaded apertures 268 of mounting bosses 264. Positioned between peripheral surface 258 of actuator base 232 and upper surface 214a of elongated body 236 are a pair of resilient pads 272, which provide bearing support for actuator 216 on bracket 214. Pads 272 are of similar construction to pads 72 and, therefore, reference is made thereto for further description of pads 272.

It should be understood from the foregoing, that mounting bosses 264 may be sized to permit an interference fit between actuator 216 and bracket 214 and, further, elongated body 236 may include enlarged central portions similar to bracket 114 to provide a 100% bearing contact with peripheral portion 258 or actuator housing 230 as described in reference to bracket 114.

Figure 7:
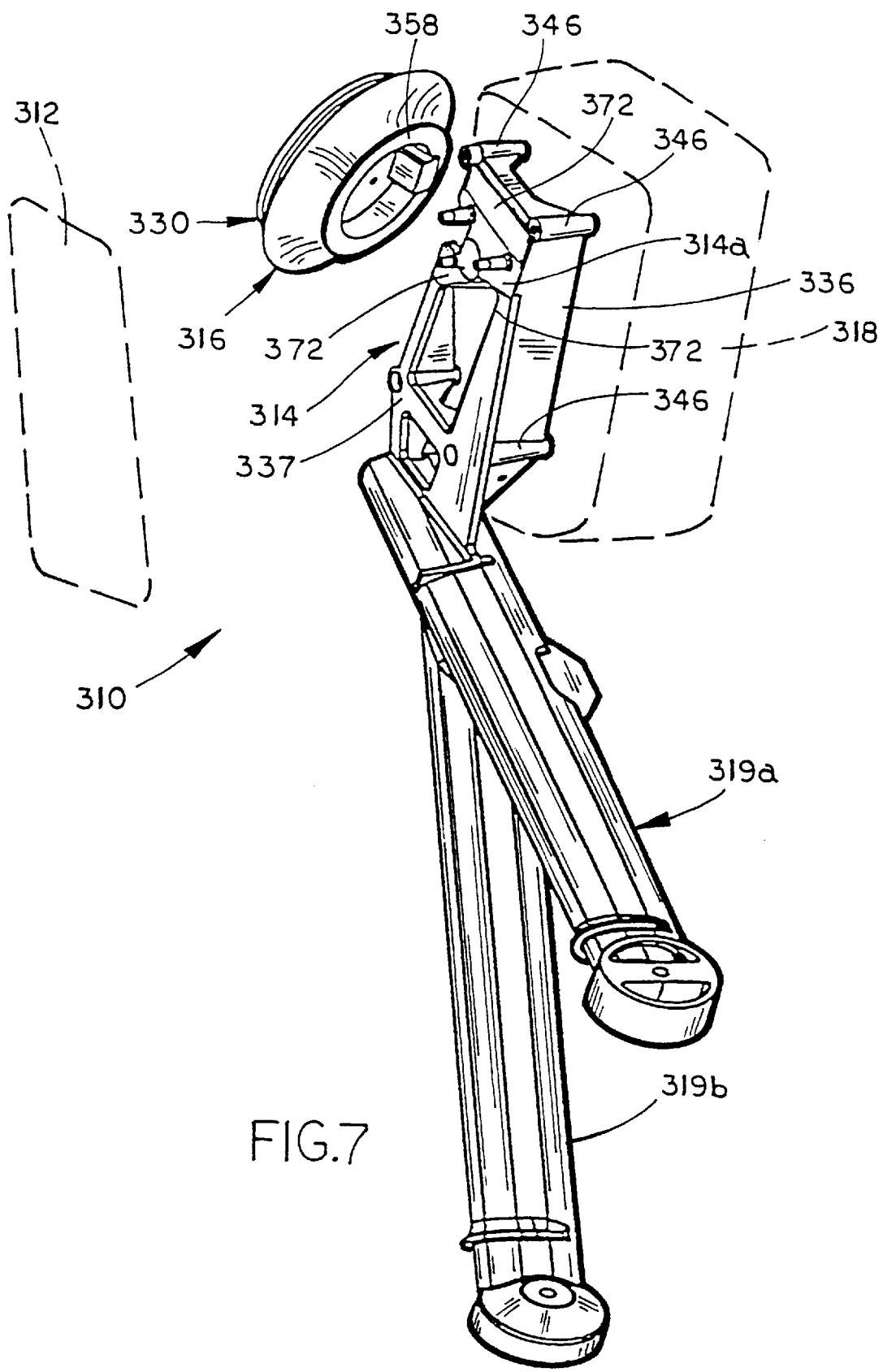
FIG. 7 is an exploded perspective view of a fourth embodiment of the vehicular exterior rearview mirror assembly of the present invention.

A fourth embodiment 310 of vehicular rearview mirror assembly of the present invention is illustrated in FIG. 7. Again, like numerals are used to indicate corresponding parts included in mirror assembly 10. Assembly 310 includes a casing 318, a reflective element 312, which is supported on a modified support bracket 314 by actuator 316. Further, assembly 310 includes mounting arms 319a and 319b which are formed with or mounted to bracket 316 and are adapted to mount directly to the vehicle door panel or vehicle frame (not shown).

Bracket 314 includes an elongated body 336 and a reinforcing member or web 337. Bracket 314 includes a plurality of mounting bosses 346 which extend through web 337 and elongated body 336 for receiving fasteners (not shown) to secure casing 318 to mounting bracket 314. Similar to the first and third embodiments, an upper or mounting surface 314a of mounting bracket 314 includes a gasket in the form of resilient pads 372, which are secured thereto by, for example, an adhesive, and provide bearing contact between support bracket 314 and peripheral portion 358 of actuator housing 330 to provide a rigid mounting of actuator 316 on support bracket 314. Reference is made to the first embodiment for further details of suitable resilient pads. It should be understood, from the foregoing, that support bracket 314 may be modified to provide an interference fit similar to the second embodiment and, further, to include an enlarged contact area to provide approximately 100% bearing contact with peripheral portion 358 similar to the second embodiment of the present invention.

Figure 8:
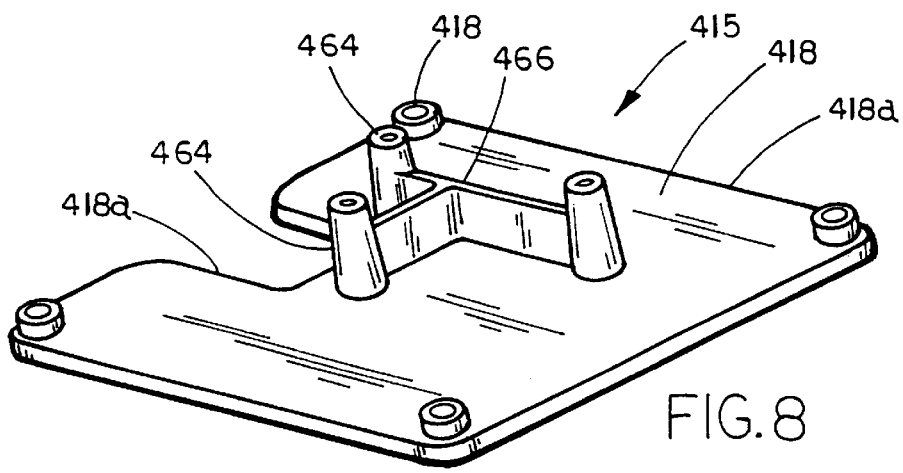
FIG. 8 is an enlarged perspective view of an adapter plate of the present invention.

Referring to FIG. 8, the numeral 415 generally designates an adapter of the present invention. Adapter 415 may be used in conjunction with any of the previously described support brackets. As best seen in FIG. 8, adapter 415 includes a plate member 418 and a plurality of mounting bosses 420 which receive fasteners (not shown) for mounting adapter 415 to a bracket, such as bracket 14. It should be understood, however, that adapter 415 may also be used with brackets 114, 214, and 314.

Figure 10:
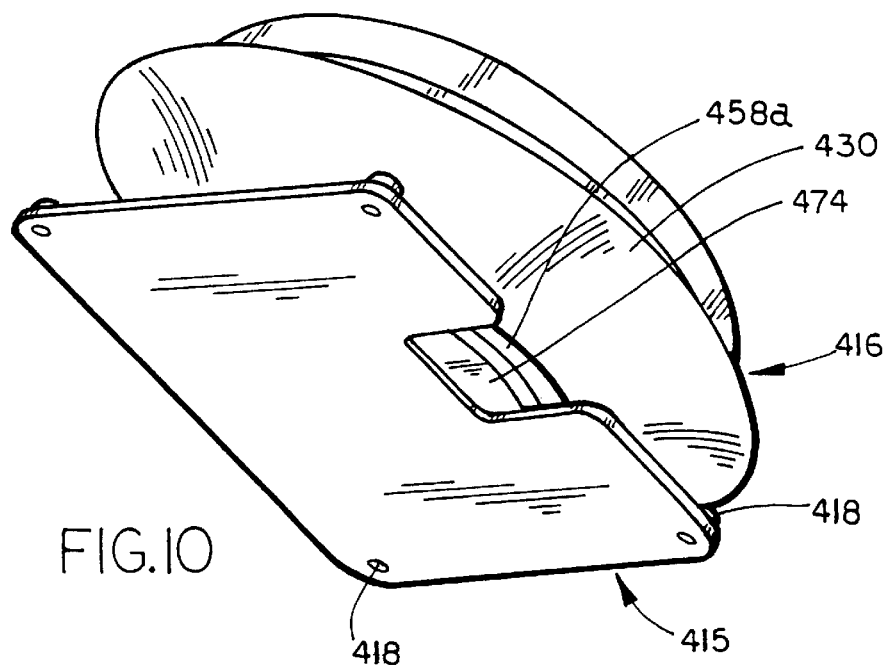
FIG. 10 is a prospective view of the actuator to the adapter plate of FIG. 9.

In addition, adapter 415 includes a second plurality of mounting bosses 464, which are reinforced by interconnecting walls 466, similar to the previous embodiments. Mounting bosses 464 are similar to mounting bosses 64, 164, 264, and 364 and receive fasteners for mounting actuator 416 onto adapter 415 to thereby mount adapter to bracket 14, for example. Plate member 418 includes a planar bearing surface 418a and is preferably sized to contact effectively all of the available bearing surface 458a of actuator housing 430, with the exception of the bearing surface adjacent the electrical housing 474 (FIG. 10). In order to accommodate electrical housing 474, which projects outwardly from housing 430, plate member 418 includes a notched portion 418a.

Figure 9:
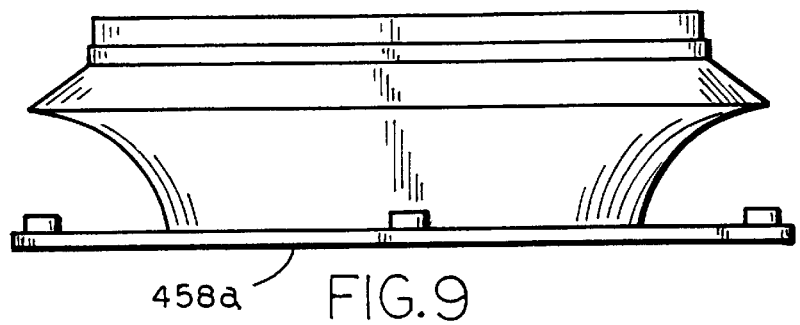
FIG. 9 is a side elevation view of an actuator mounted to the adapter plate of FIG. 9.

As will be understood from FIGS. 9 and 10, mounting bosses 464 are sized such that bearing surface 418a of plate member 418 makes direct contact with annular surface 458a of actuator housing 430. In this manner, adapter 415 provides an interference fit with actuator 430 and rigidly supports actuator 430 in the respective mirror assembly, similar to the previous embodiments. Adapter 415 may be formed from a metal, including, for example cast aluminum similar to bracket 14, or may comprise a plastic material, such as a reinforced polymer, such as reinforced nylon, or the like.

Accordingly, the present invention provides rearview mirror assemblies for use on large vehicles which exhibit reduced vibration in the reflective element. This reduction in the vibration is achieved by improving the vibration characteristics of the rearview mirror assembly itself and by providing a bearing contact between at least a portion of the peripheral surface of the actuator housing and the support bracket. By controlling the height of the mounting bosses, the actuator may be directly mounted onto the mirror assembly support bracket to provide an interference fit between the actuator housing and the mounting surface of the support bracket without warping the actuator housing base wall. Furthermore, existing mirror assemblies may be modified to achieve the claimed invention by incorporating a gasket, such as the resilient pads described in reference to the first, third, and fourth embodiments. While several forms of the invention have been shown and described, other forms will now become apparent to those skilled in the art. For example, while the resilient pads are illustrated as rectangular discrete pads, it should be understood that a single unitary pad may be provided which includes cut-outs for the mounting bosses and reinforcing walls. In addition, the concept of this invention may be used with other configurations of support brackets, casings, and actuators. In addition, the number of mounting bosses may be increased as needed to accommodate varying actuator mounting arrangements. Therefore, it will be understood that the embodiments shown in the drawings and described above are merely for illustrative purposes only and are not intended to limit the scope of the invention which is defined by the claims which follow. The embodiments of the invention in which we claim an exclusive property or privilege are as follows.

The embodiments of the invention in which we claim an exclusive property or privilege are as follows:

1. An exterior rearview mirror assembly for large vehicles, such as trucks and vans, said exterior rearview mirror assembly comprising:

a reflective mirror element;

a mirror casing adapted to mount to a vehicle;

a mounting surface provided in said mirror casing;

an actuator having an actuator housing and a movable portion engaging said reflective element, said movable portion provided at one side of said actuator housing, said actuator housing having a recessed portion and a raised peripheral portion having a substantially planar surface extending around said recessed portion and facing said mounting surface, said raised peripheral portion on an opposite side of said actuator housing from said movable portion, said actuator housing being mounted to said mounting surface; and bearing contact being provided between said mounting surface and at least a portion of said substantially planar surface of said actuator housing, and said planar surface contacting said bearing contact whereby said assembly has reduced vibration and improved stability.

2. The mirror assembly of claim 1, wherein said bearing contact comprises a resilient member interposed between said mounting surface and said portion of said planar surface of said actuator housing.

3. The mirror assembly of claim 2, wherein said resilient member comprises at least one resilient pad, said resilient pad being secured to said mounting surface.

4. The mirror assembly of claim 3, wherein said resilient pad is secured to said mounting surface by an adhesive.

5. The mirror assembly of claim 2, wherein said resilient member compresses in a range of 10% to 30% when said actuator is mounted to said support bracket.

6. The mirror assembly of claim 3, wherein said resilient pad comprises a cellular urethane material.

7. The mirror assembly of claim 2, wherein said resilient member comprises a pair of resilient pads.

8. The mirror assembly according to claim 2, wherein said resilient member has a durometer in a range of approximately 12 to 18 Shore O.

9. The mirror assembly of claim 1, wherein said mounting surface comprises a support bracket.

10. The mirror assembly of claim 9, wherein said support bracket provides bearing contact for at least 50% of said substantially planar surface of said actuator housing.

11. The mirror assembly of claim 9, wherein said support bracket provides bearing contact for at least 75% of said planar surface of said actuator housing.

12. The mirror assembly of claim 9, wherein said support bracket provides bearing contact for approximately 100% of said planar surface.

13. The mirror assembly of claim 12, wherein said support bracket includes an enlarged medial portion, said enlarged medial portion being at least as large as said planar surface of said housing and providing said bearing contact.

14. The mirror assembly according to claim 13, wherein said support bracket includes an adapter mounted thereto, said adapter providing said enlarged medial portion.

15. The mirror assembly according to claim 9, wherein said support bracket is adapted to mount said mirror casing to a vehicle.

16. The mirror assembly of claim 1, wherein said movable member extends into said actuator housing and forms a friction contact with said actuator housing, said movable member providing adjustment for said reflective element, and said actuator including a biasing member to urge said housing into said frictional engagement with said movable member to thereby enhance the friction between said movable member and said housing to reduce vibration of said movable member and of said reflective element.

17. The mirror assembly of according to claim 16, wherein said biasing member comprises a resilient annular member extending around said actuator housing to urge said actuator housing into frictional contact with said movable member.

18. The mirror assembly according to claim 17, wherein said resilient annular member comprises an elastic ring.

19. The mirror assembly according to claim 9, wherein support bracket comprises an elongated support bracket.

20. The rearview mirror assembly according to claim 9, wherein said support bracket comprises a truss-type bracket.

21. The mirror assembly according to claim 9, wherein said support bracket includes a pair of elongated side members and interconnecting webs extending between said side members to form a reinforced support bracket.

22. The mirror assembly according to claim 9, wherein said support bracket comprises a bracket cast from a material selected from the group consisting of aluminum, aluminum alloy, and magnesium.

* * * * *

UNITED STATES PATENT AND TRADEMARK OFFICE
CERTIFICATE OF CORRECTION

PATENT NO. : 6,488,383 B1  Page 1 of 1
DATED : December 3, 2002
INVENTOR(S) : Karl H. Hanft, Edward A. Gahan and David N. Sizemore It is certified that error appears in the above-identified patent and that said Letters Patent is hereby corrected as shown below:

Column 1,
Line 12, insert -- by -- after "incorporated".

Column 4,
Line 7, "in" should be -- is an --.
Line 27, insert -- bottom -- after "a"; and "prospective" should be -- perspective --.

Column 6,
Line 47, delete "Hi" after "be".

Column 11,
Line 21, "m ember" should be -- member --.

Signed and Sealed this

Twenty-fifth Day of April, 2006

JON W. DUDAS
*Director of the United States Patent and Trademark Office*